W. B. MACKINTOSH.
GAGE.
APPLICATION FILED JULY 28, 1917.
1,258,426. Patented Mar. 5, 1918.
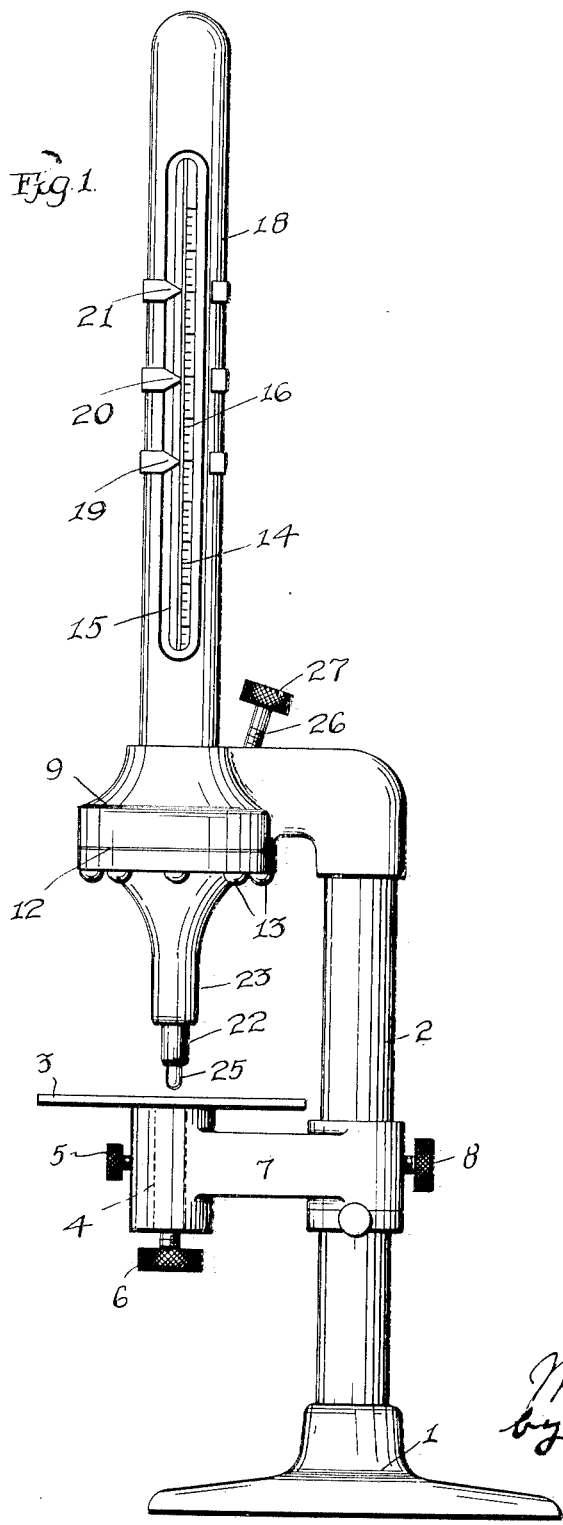
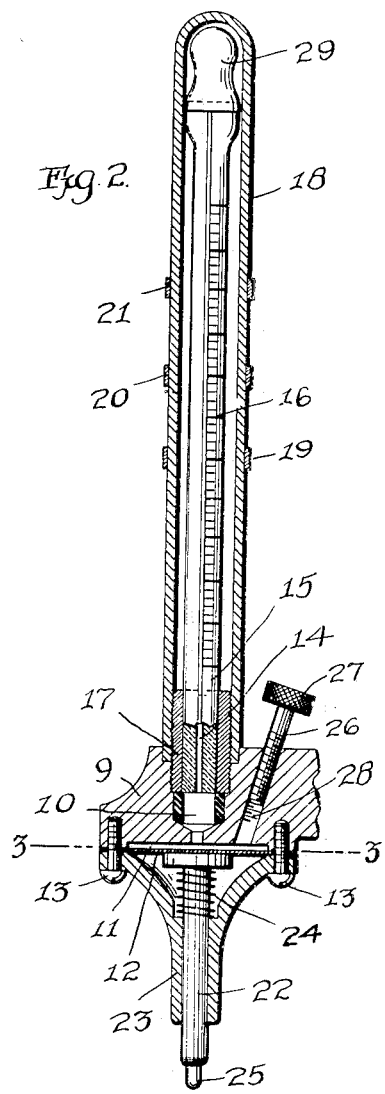
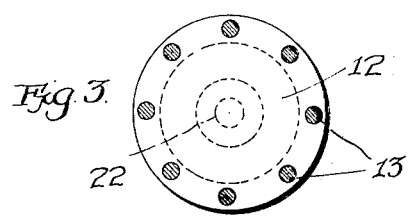
Inventor
William B. Mackintosh
by Attorney
W. F. Bivans

UNITED STATES PATENT OFFICE.

WILLIAM B. MACKINTOSH, OF NEW YORK, N. Y., ASSIGNOR TO COATS MACHINE TOOL COMPANY INC., OF NEW YORK, N. Y., A CORPORATION OF NEW YORK.

GAGE.

1,258,426.   Specification of Letters Patent.   Patented Mar. 5, 1918.

Application filed July 28, 1917. Serial No. 183,249.

*To all whom it may concern:*

Be it known that I, WILLIAM B. MACKINTOSH, a citizen of Great Britain, now residing in the city, county, and State of New York, (whose post-office address is c/o Coats Machine Tool Company, 30 Church street, New York city,) have invented new and useful Improvements in Gages, of which the following is a specification.

My invention relates to gages with liquid indicating columns and its object is to increase the sensitiveness, accuracy and reliability of the instrument. With the above and other objects in view my invention consists in the parts, improvements and combinations more fully pointed out hereinafter.

Referring now to the drawings attached to the specification—

Figure 1 is an elevation of the measuring instrument.

Fig. 2 is a longitudinal section of the upper portion of the instrument.

Fig. 3 is a cross section on line 3—3 of Fig. 2.

In the drawings 1 indicates a suitable base for the instrument from which rises the post 2. A platform 3 is carried by the post and can be raised and lowered or swung about it. The platform is provided with a stem 4, which can be adjusted up and down by adjusting screw 5 and clamped in place by set screws 6 on bracket 7. A set screw 8 secures the bracket to the post in any desired position. The top of the post carries a casing 9 bored out to contain a liquid receiving chamber 10. The chamber 10 communicates with a liquid receiving space 11 above the diaphragm 12. The diaphragm is secured to the casing 9 by screws 13. The liquid column 14 is contained in the glass tube 15 provided with gage marks 16, the tube being secured into the casing 9 by means of screw sleeve 17. The glass tube is made of opal glass of magnifying cross-section so as to improve the readability of the instrument.

The liquid column being in communication with the chamber 10 indicates by its height the amount of movement of the diaphragm and consequently the thickness or other linear dimension of the object being gaged which is placed on the platform 3. A hood 18 protects the glass tube and in accordance with my improvement is provided with a plurality of clip pointers 19, 20 and 21 which are easily moved and held by their clamping action at the desired indicating position. The clip 19 may be set at the normal level of the liquid or zero position and the clips 20 and 21 may be adjusted to the positions indicated by the object to be measured.

In accordance with my invention, I increase the sensitiveness of the instrument by providing a plunger 22 independent of the diaphragm for communicating the motion to it. By this means, a thin or corrugated diaphragm can be utilized which thereby additionally increases the sensitiveness of the instrument. The plunger 22 is accurately guided in its movement, throughout its length by guide casing 23 which is secured to the upper casing by screws 13. Spring 24 resting against the head of the plunger keeps it against the diaphragm at all times. The plunger 22 terminates in a projection 25 forming one of the calipering anvils of the gaging device, the other being the platform 3.

In order to keep the liquid constantly at zero and thereby compensate for the rise and fall due to changes in temperature of the atmosphere surrounding the device, I provide a small, regulating threaded screw 26 with head 27 which closes passageway 28 at one end, the passageway communicating with the chamber 11. When the screw is screwed toward the diaphragm, liquid is thus forced up the tube. This enables the operator to at once adjust the instrument for variations in temperature.

In order to avoid difficulties arising from evaporation of the indicating liquid, I enlarge the top of the glass tube and provide it with a rubber cap 29 which yields as the liquid rises and prevents evaporation, without interfering with the readings.

Having thus described my invention, its operation will be clear.

The platform 3 is adjusted to the desired height and a gage block of standard width placed upon it. This will cause the plunger 22 to rise and the indication is then read and clip 19 with its pointer placed opposite the indicated gage mark. The article to be measured is now placed upon the platform and a new reading taken and indicated by pointer 20. Temperature changes of the liquid column are corrected by set screw 26.

Pointer 21 may be used to mark the indication of another dimension of the object to be gaged.

What I claim and desire to secure by Letters Patent is:

A measuring gage comprising in combination a base, a gage glass adapted to contain a liquid indicating column supported by said base, a chamber communicating with said gage glass and provided with a diaphragm, a plunger independent of the diaphragm and contacting therewith, means for guiding said plunger, a spring for pressing one end of said plunger into contact with said diaphragm, the other end of said plunger having a calipering terminal, and a platform carried by the base and beneath said plunger and adapted to support the article to be calipered.

In testimony whereof, I have signed my name to this specification, in the presence of two subscribing witnesses.

WILLIAM B. MACKINTOSH.

Witnesses:
W. F. BISSING,
LOUELLA F. LITTLE.